United States Patent Office 3,158,227
Patented Nov. 24, 1964

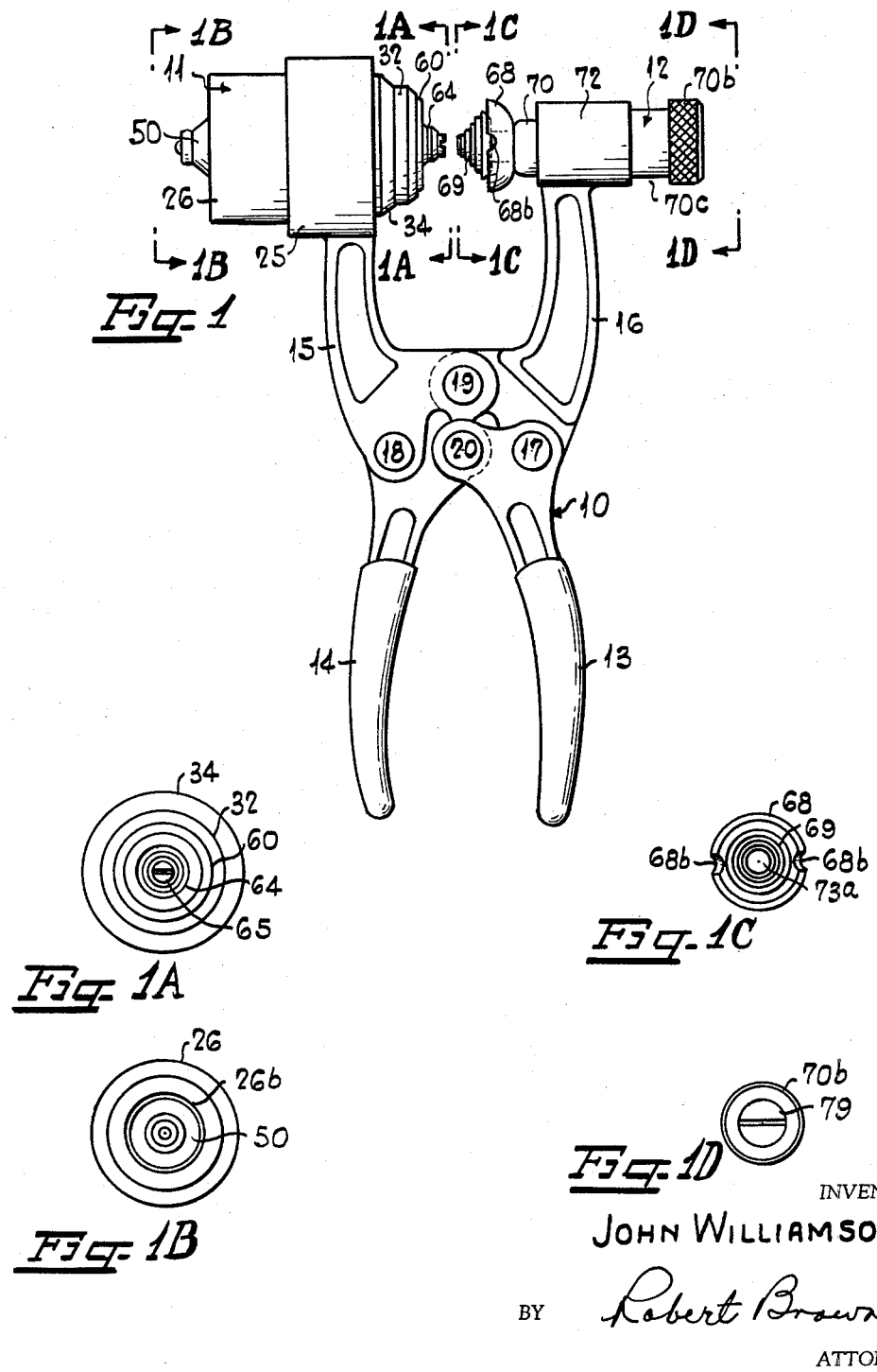

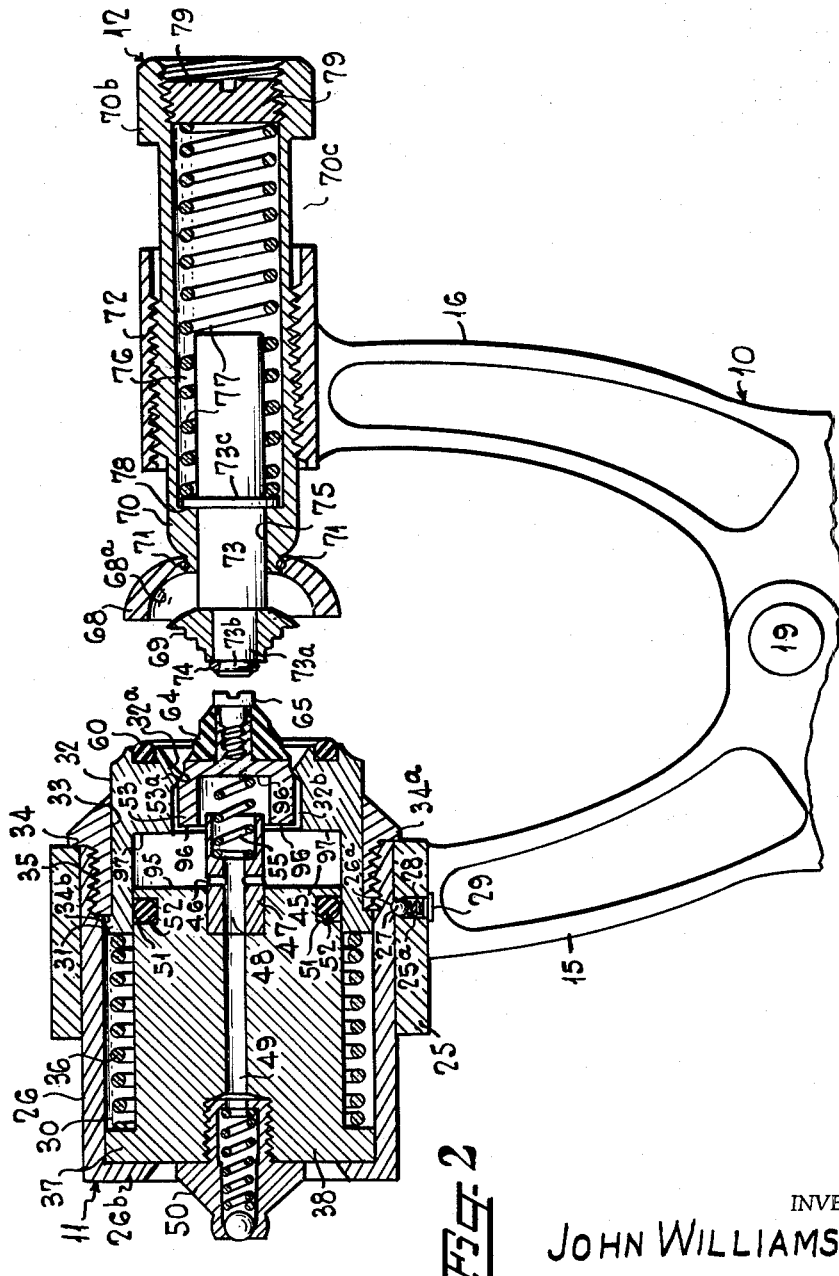

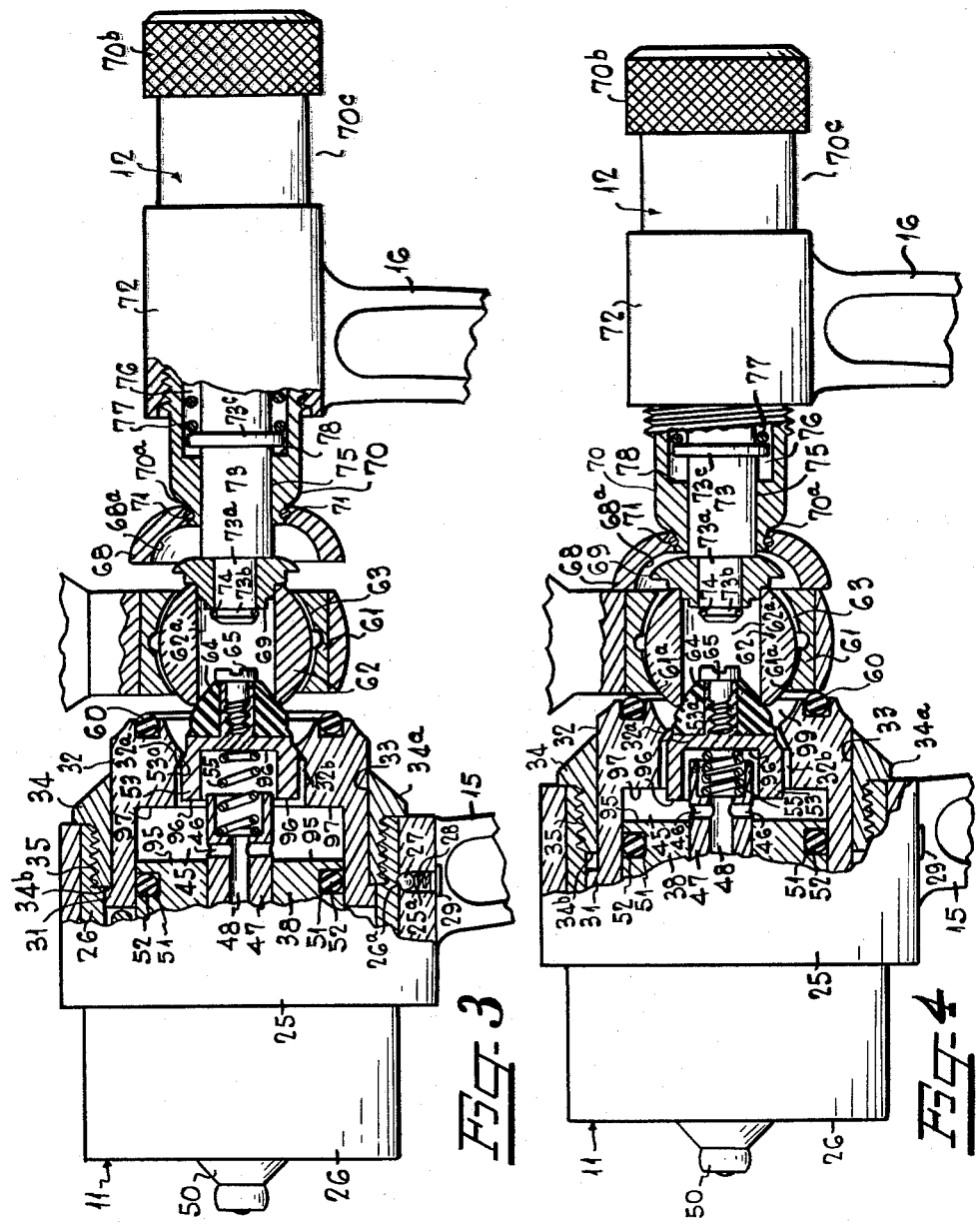

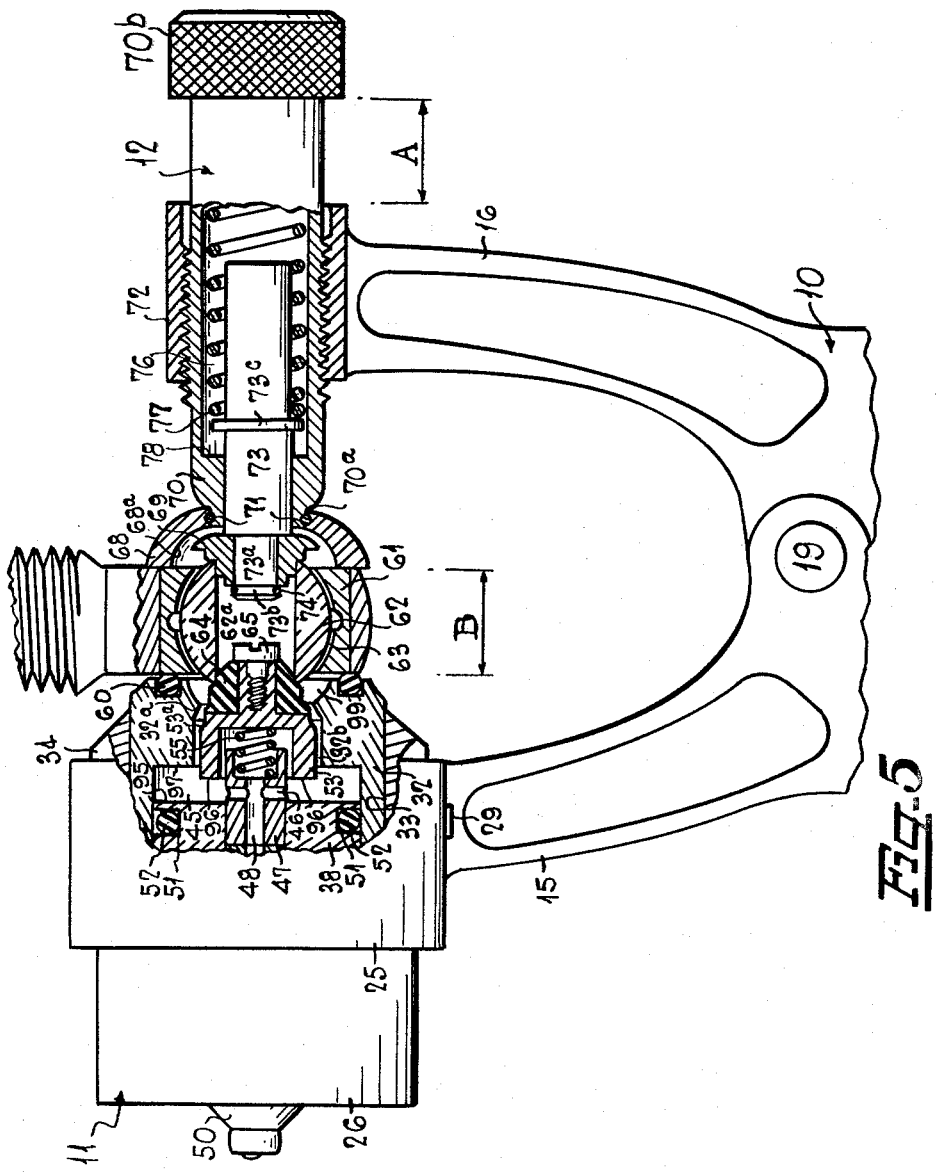

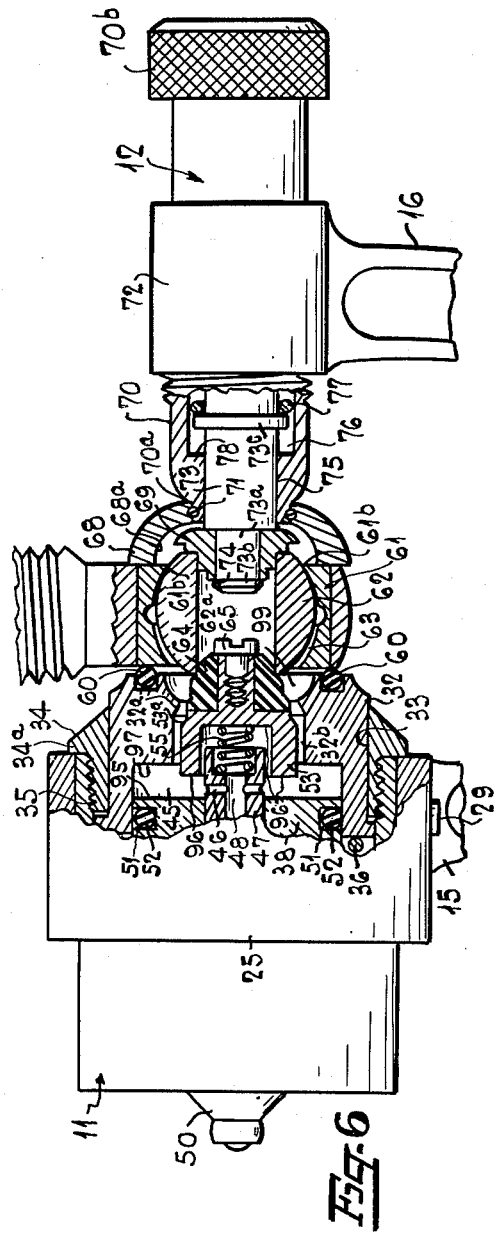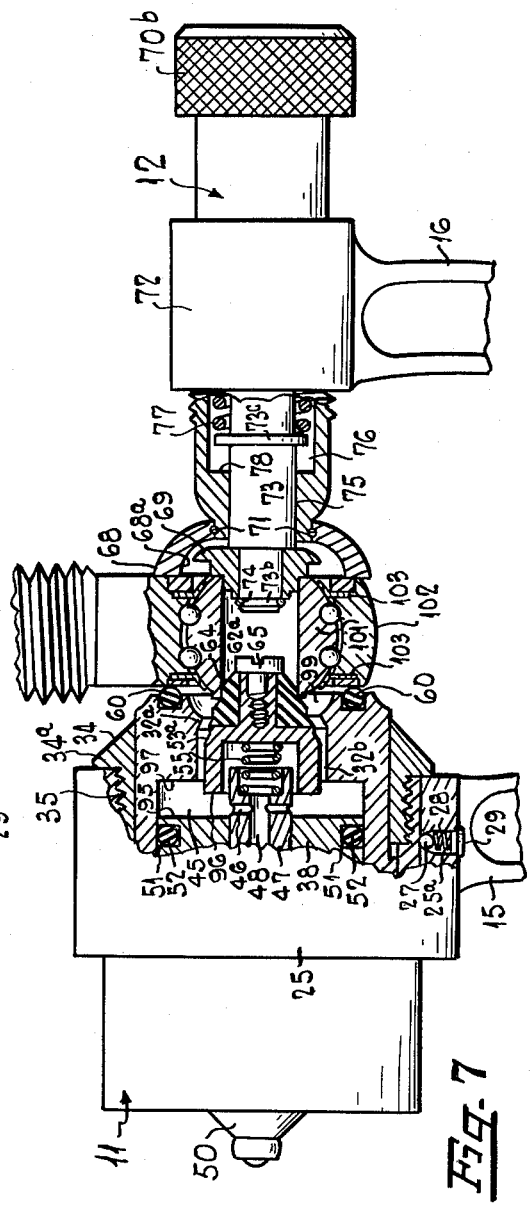

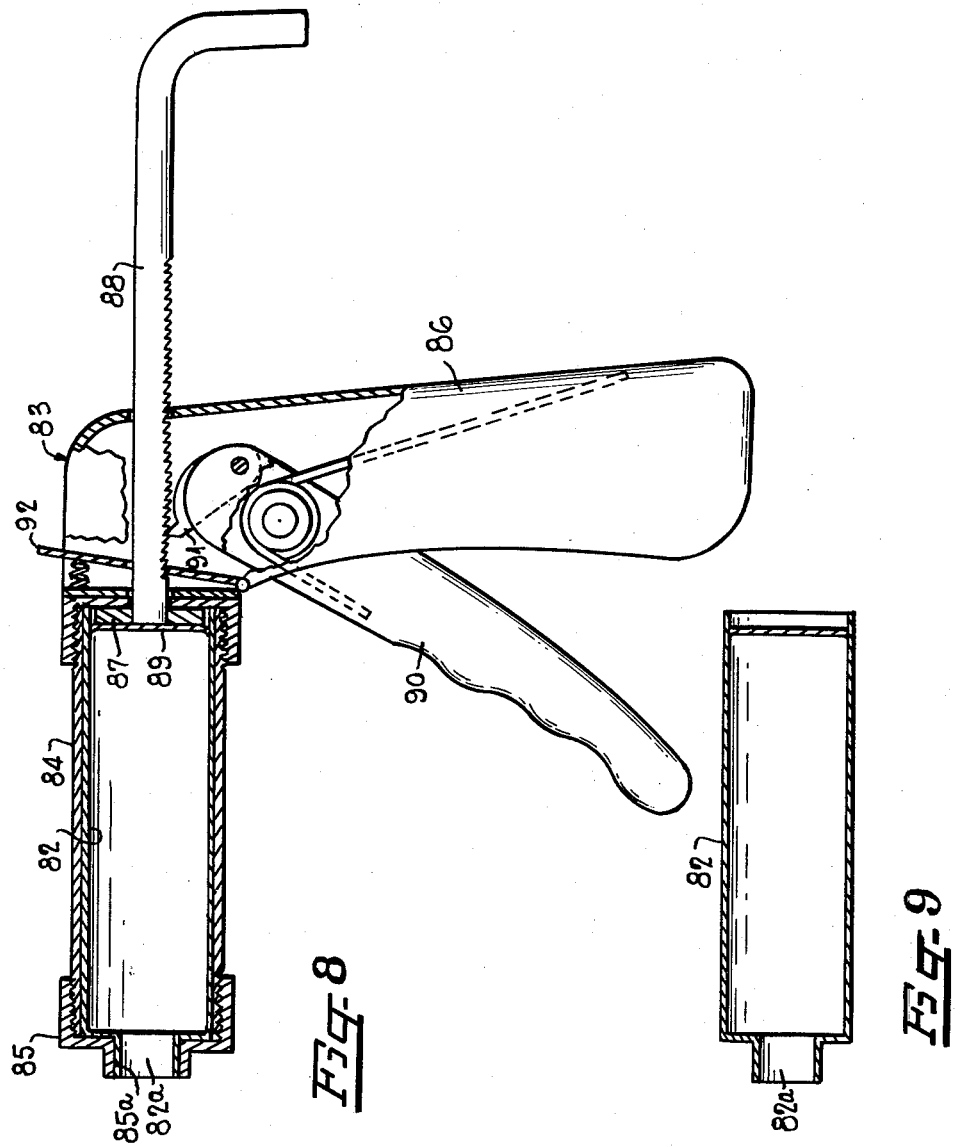

3,158,227
METHOD AND MEANS FOR LUBRICATING BEARINGS
John Williamson, St. Louis, Mo., assignor to Drake Engineering, Inc., Southfield, Mich., a corporation of Delaware
Filed Oct. 10, 1962, Ser. No. 229,693
15 Claims. (Cl. 184—1)

This invention is a continuation-in-part of my co-pending application Serial No. 150,744, filed November 7, 1961, and relates to a device for and method of lubricating plain and anti-friction bearings comprising inner and outer relatively rotatable bearing components provided with an annular space or clearance therebetween. The annular clearance extends through the bearing and is concentric with its axis of rotation. Ordinarily, the inner component of such bearings has a cylindrical bore extending therethrough along the axis of rotation of the bearing.

Broadly stated, the present invention consists of three principal components, namely, a lubricant injector head assembly adapted to engage one face of a bearing to be lubricated, an oppositely disposed pressure head assembly adapted to engage the opposite face of the bearing, and a clamping mechanism for moving the two assemblies toward and away from each other to respectively clamp and release the bearing. In clamped position, an annular orifice of the injector head assembly communicates with one end of the above-mentioned annular bearing clearance while injecting a lubricant under pressure.

Optimum performance requires the line of communication between the injector head orifice and the bearing clearance to be sealed or leak-proof. To effect this requirement, means have been provide for automatically centering the respective inner and outer bearing components between the pressure head and injector head assemblies simultaneously with the formation at the injector head orifice of a double-seal junction, one seal surrounding the outer periphery of the annular bearing clearance and the other being surrounded by the latter and closing the bore in the inner bearing component.

An important object of this invention is to provide a compact self-contained lubricating device that will effectively lubricate and purge plain and anti-friction type bearings and pulleys without the aid of an attached pressure gun or any other auxiliary attachment and which is so constructed and arranged that on-the-job lubrication of hard-to-reach bearings may be accomplished.

Another object of this invention is to provide a lubricating device with an improved self-aligning arrangement that will automatically align the lubricator with respect to the bearing and then accurately position the bearing components in the lubricator whereby on-the-job lubrication of bearings difficult to reach and examine may be accomplished.

It is another object of this invention to provide a lubricator that will purge and lubricate sealed or shielded anti-friction bearings or pulleys at relatively low pressures so that bearing seals or shields will not be damaged.

Still another object of this invention is to provide a lubricator that will purge and lubricate sealed or shielded anti-friction bearings or pulleys without disassembling said seals or shields.

It is a further object of this invention to provide a lubricating device with a self-sealing arrangement that eliminates possible contamination of grease contained within the injector head of the lubricator.

It is a further object of this invention to provide a lubricating device, the component parts of which are easily assembled and disassembled for the purpose of inspection, repair or purging.

It is a further object of this invention to provide a device for lubricating plain-type bearings from a source of lubricant under pressure, in combination with means for oscillating the inner and outer bearing components relative to one another according to a fixed pattern during the introduction of lubricant therebetween.

It is a further object of this invention to provide a lubricator that controls the position of the inner component or bearing ball in relationship to the outer component or bearing race so that anti-friction type bearings can be lubricated at low pressures and without damage to the bearing dirt seals.

Other objects and specific advantages of this invention will more fully appear from the following description and accompanying drawings, in which:

FIGURE 1 is an elevational view of my lubricator showing a pressure head assembly and an injector head assembly respectively mounted upon a pair of relatively movable jaws of a hand clamp, the clamp being shown in closed position and the pressure head assembly being adjusted to mid-point position;

FIGURE 1A is an end view of the injector head assembly and taken along line 1A—1A in FIGURE 1;

FIGURE 1B is a view of the opposite end of the injector head assembly from that shown in FIGURE 1A and taken along the line 1B—1B in FIGURE 1;

FIGURE 1C is an end view of the pressure head assembly and taken along line 1C—1C in FIGURE 1;

FIGURE 1D is a view of the opposite end of the pressure head assembly from that shown in FIGURE 1C and taken along line 1D—1D in FIGURE 1;

FIGURE 2 is an enlarged longitudinal sectional view through the injector head and pressure head assemblies of the lubricator when in the same relative positions as shown in FIGURE 1;

FIGURE 3 is an enlarged view of the lubricator, partly in elevation and partly in section, showing the relative positions of the components of a plain rod end bearing when initially clamped between the injector head and pressure head assemblies, and also showing the corresponding relative positions of the adjacent assembly components;

FIGURE 4 is an enlarged view of the lubricator, partly in elevation and partly in section, showing the relative positions of the bearing components and adjacent assembly components when in the initial pre-lube full contact position;

FIGURE 5 is a view similar to FIGURES 3 and 4, but showing the relative positions of the bearing and adjacent assembly components at the point in the clamping cycle that develops equal pressures upon the inner component of the bearing;

FIGURE 6 is a view similar to FIGURES 3, 4 and 5, but showing the relative positions of the bearing and adjacent assembly components when the opposite heads of the lubricator are in fully clamped position;

FIGURE 7 is an enlarged view of the lubricator, partly in elevation and partly in section, showing the opposite heads of the lubricator in fully clamped position about a ball bearing type of rod end bearing equipped with dirt seals;

FIGURE 8 is a sectional detail view of a dispenser such as used to charge the injector head with a supply of grease, and FIGURE 9 is a sectional detail view of the grease cartridge adapted to removably fit within the dispenser.

By referring to FIGURE 1 of the drawings, it will be observed that the present invention comprises three assemblies, namely, a clamp assembly 10, an injector head assembly 11 and a pressure head assembly 12.

Various types of clamping devices may be employed to develop the pressures necessary for operation of the injector head and pressure head assemblies. The hand clamp assembly 10, however, has been found to be an especially useful device inasmuch as it serves the dual function of a handle for supporting the assemblies and as a device for transmitting pressure from one hand of the operator to a bearing clamped between the assemblies.

The numerals 13 and 14 denote the handles of the clamp assembly 10, said handles being connected to clamp arms 15 and 16 by means of a suitable joint mechanism consisting of pivots 17, 18, 19 and 20. The joint mechanism is so constructed and arranged that relative movement of the handles 13 and 14 will effect relative movement of arms 15 and 16 and the respectively attached injector head and pressure head assemblies 11 and 12.

The upper end of arm 15 (FIGURES 1 and 2) has integral therewith a sleeve 25 in which an outer casing 26 of the injector head 11 is releasably attached by means of ball 27, which ball is yieldingly pressed into a cavity 26a in casing 26 by means of a spring 28. Spring 28 and ball 27 are confined in a bore 25a in sleeve 25 by means of a nut 29.

Casing 26 is provided with a bore 30 in which is slidably mounted the outwardly extending rim or flange 31 of an outer piston 32, said piston being slidably mounted in a bore 33 in a nut 34 and said nut being threadably secured in the end of casing 26 as at 35. Nut 34 is provided with an outwardly extending rim or flange 34a which abuts one end of sleeve 25 and cooperates with spring-pressed ball 27 to removably hold the injector head assembly 11 in position. The inner end of nut 34 is positioned in the path of rim 31 and thereby serves as a stop at point 34b to limit the movement of outer piston 32 toward the pressure head assembly 12 when the lubricator is not in use (FIGURE 2).

A spring 36 has one end thereof yieldingly abutting the rim 31 to normally press the rim and its associated piston 32 toward pressure head assembly 12, said spring having its other end abutting a rim or flange 37 integral with grease bulkhead-piston 38. The diameter of bulkhead-piston 38 is smaller than that of bore 30 and is surrounded by spring 36. It will be observed in FIGURE 2 that flange 37 may be installed by sliding it into the right-hand end of casing 26 prior to installation of outer piston 32 and nut 34. After installation, the flange 37 and bulkhead-piston 38 are pressed into a relatively stationary position by spring 36 against inturned annular flange 26b of casing 26.

The right-hand end of bulkhead-piston 38 fits into a bore 45 in outer piston 32. In operation, the bulkhead-piston serves as a guide upon which the outer piston 32 is mounted for reciprocatory movement in response to the clamping pressures to be described hereinafter. Bore 45 also serves as a grease reservoir into which a charge of grease under pressure is introduced by means of the dispensing device shown in FIGURE 8. The grease inlet passageway for connecting the bore 45 to the dispensing device comprises radially disposed orifices 46 in sleeve 47, alined grease ducts 48 and 49 in sleeve 47 and bulkhead-piston 38 respectively, and grease fitting 50 threadably secured in the exposed outer end of the bulkhead-piston and surrounded by inturned flange 26b of casing 26.

The outer periphery of bulkhead-piston 38 is provided with a circumferential groove 51 in which a packing or resilient O ring 52 is mounted, said ring also slidably engaging the periphery of bore 45 to prevent escape of grease from reservoir 45 into bore 30.

Slidably mounted upon sleeve 47 is an inner piston 53 which is free to slide between forward and backward limits. Forward or inward travel of piston 53 (that is, toward pressure head assembly 12) is limited by engagement of the piston shoulder 53a with inturned shoulder 32a on outer piston 32, and backward travel is limited by contact of the piston with the forward or projecting end of sleeve 47. The contact between shoulders 32a and 53a constitute a valve through which grease is permitted to escape during lubrication of a bearing. This valve is maintained in closed position by thrust spring 55 when the lubricator is not in operation to thereby seal the grease in reservoir or bore 45 and prevent contamination from exterior media.

Removably mounted in an annular groove in the forward face of piston 32 is a resilient ring 60, one edge of this ring projecting forwardly of the piston face and adapted to contact the face of an outer bearing component such as designated by numeral 61 (FIGURE 4). Bearing component 61 has inner component 62 rotatably mounted therein, said components having an annular clearance 63 therebetween and extending axially through the bearing. Upon contact by ring 60 with outer bearing component 61 a sealed connection is formed around the adjacent end of annular clearance 63. The inner bearing component 62 has a conventional bore 62a extending axially therethrough, which bore is adapted to be closed and sealed by a resilient stepped cone 64 secured to the forward end of inner piston 53 by suitable means such as a screw 65. Thus the ring 60 forms an outer sealed connection surrounding the end of annular clearance 63 while the cone 64 forms a second or inner sealed connection surrounded by the end of said clearance.

It should be noted that the removal of threaded nut 34 from the end of outer casing 26 allows instant removal of all grease contact components of the injector head assembly for the purpose of purging and cleaning.

From the foregoing description, it will be noted that the injector head assembly 11 has been provided with component parts so arranged that the inner-piston 53, the outer-piston 32, a check valve 50, a grease reservoir 45, and a grease bulkhead-piston 38 combine in operation to constitute a grease injector capable of lubricating a plurality of bearings efficiently without auxiliary attachment.

The pressure-head assembly 12 is provided with two bearing contact members: the cup shaped contact member 68 and the stepped cone contact member 69, the member 68 being mounted unyieldingly on assembly 12 and member 69 being spring loaded as will be more fully described later. Member 68 is provided with a recess 68a for receiving at least a part of stepped cone 69 when the latter is forced to a retracted position (FIGURE 5) by operational clamping stresses.

During operation, the rim of member 68 makes forcible contact with the outer bearing component 61 on the opposite side from the contact made by resilient ring 60; thereby effecting a seal between outer bearing component 61 and resilient ring 60. Also during operation, one of the steps of member 69 makes forcible contact with the edge of the inner bearing component 62 on the opposite side from the contact made by resilient stepped cone 64; thereby effecting a seal between inner bearing component 62 and resilient stepped cone 64. On the other hand, members 68 and 69 are preferably made of metal or similar relatively hard material and therefore do not form sealed contacts with the respective outer and inner bearing components 61 and 62. Instead, vented contacts are effected by providing one or more radial grooves 68b (FIGS. 1 and 1C) so as to prevent accumulation of a back pressure when lubricant is forced into clearance 63 by the injector head assembly 11.

Contact member 68 is removably held in position upon the restricted end of an outer casing 70 by suitable means such as a spring ring 71. The clamping stresses exerted at the rim of cup-shaped contact member 68 will be transmitted to outer casing 70 at shoulder 70a, said outer casing being threadably mounted in sleeve 72 integral with the upper end of clamp arm 16. It will be observed that contact member 68 is mounted for limited universal movement relative to the end of the supporting casing 70 so that the rim of the contact member will remain in contact with the face of outer bearing component during a complete clamping cycle to be described below in detail.

Thus it will be observed from FIGURES 2 through 5 as described above that the members 15, 25, 26 and 34 comprise a jaw which carries the piston 32 and ring 60, the two last-named members serving to clamp one face of the outer bearing portion 61. Similarly, the members 16 and 72 comprise a cooperating jaw which carries members 70 and 68 which serve to clamp the opposite face of the outer bearing. When the opposed clamps are closed, the members 64, 69, 68 and 60 have coinciding axes as illustrated in FIGURES 6 and 7.

Moreover, the bearing 61, 62 is automatically centered and automatically placed in proper relationship to the sealing contacts because of the manner in which initial engagement is made by contacts 64 and 69 with the inner bearing member 62; and because of the follow-up action during which contacts 60 and 68 engage the outer bearing member 61. The initial engagement by contacts 64 and 69 suspends the bearing 61, 62 as the cone-shaped contact 64 enters the bore 62a of the inner bearing portion from one side of the bearing; and as stepped cone-shaped contact 69 makes contact on the opposite face of the inner bearing portion. Contact 69 forces contact 64 into the bearing bore to thereby center the bearing.

For perfect placement within the lubricator, the faces of the inner and outer bearing portions must be perpendicular to the aligned axes of the sealing contacts 64 and 60. As the clamping means is closed on a bearing, the contact 69 positions the inner bearing member 62 so that its face is perpendicular to the aligned or common axes of all of the contacts and, therefore, perpendicular to the axis of resilient cone 64. Likewise, in this closed or clamped position, the combined action of contacts 60 and 68 positions the faces of outer bearing portion 61 at right angles to the common axes of all four contacts, as well as to the axis of resilient seal 60.

Stated differently, while the clamping apparatus moves from the position shown in FIGURE 3 to that shown in FIGURE 4, the rotational axes of the ball and socket portions 62, 61 are first caused to assume a position normal to a common plane, and then to assume a coaligned or coinciding relationship.

The first of the above-mentioned positions of the rotational axes may occur, for example, when the socket portion 62 is initially clamped symmetrically about the vertical axis of the ball portion 61 and at a clamping stage intermediate the stages shown in FIGURES 3 and 4. At such an intermediate clamping stage, the socket portion 61 may rest directly upon the upper surface of ball portion 62, rather than concentrically with the ball portion, thereby causing the clearance 63 to appear below the ball portion and the rotational axis of the socket portion to be positioned below and parallel to the rotational axes of the ball portion. When, however, the clamping apparatus further closes from the intermediate stage to the stage shown in FIGURE 4, the left-hand convex surface of ball portion 62 will slidably engage the right-hand concave surface of socket portion 61 to elevate or transversely shift the socket portion relative to its clamping contacts 60, 68 until the respective rotational axes coincide with portion 62 abutting portion 61 as at 61a.

Outer casing 70 has integral therewith an enlarged knurled head portion 70b which may be grasped to adjust the position of the pressure head assembly 12 relative to sleeve 72 as well as relative to injector head assembly 11.

The stepped cone 69 is removably secured upon the restricted end 73a of shaft 73 by any suitable means such as spring ring 74 in a groove 73b. The steps in cone 69, as well as in previously described cone 64, constitute a self-centering arrangement which adapts the lubricator for use in connection with bearings whose inner components 62 have bores 62a differing in diameter. Therefore the pressure head assembly 12 is provided with an outer-bearing contact member that is so shaped and so proportioned that, for a given range of bearing sizes, contact is made by the outer-bearing contact member only on the outer-bearing portion. Likewise, the pressure head assembly has an inner-bearing contact member so shaped and so proportioned that for a given range of bearings the inner bearing contact member makes contact only on the inner-bearing portion.

Shaft 73 is slidably mounted in a bore 75 in one end of casing 70, said bore communicating with an aligned concentric bore 76 in the other end of the casing. Shaft 73 is also provided with a collar 73c against which one end of a spring 77 abuts to normally urge said collar toward shoulder 78 at the junction of bores 75 and 76. Spring 77 surrounds shaft 73 and has its other end abutting an adjustment screw 79 which closes the end of bore 76. Thus the forward or inward travel of shaft 73 toward the injector head assembly 11 is limited by the position of shoulder 78.

*General Operation of Lubricator*

To load the lubricator, insert grease-filled cartridge 82 (FIGURE 9) into grease dispenser 83 as shown in FIGURE 8, and then connect grease outlet or neck portion 82a of this cartridge to the grease fitting 50 of the injector head 11.

Dispenser 83 comprises a cylindrical barrel 84 having a cap 85 threadably secured upon one end thereof, said cap having a bore 85a therein for receiving the cartridge neck portion 82a. The other end of cylinder 84 is threadably secured to the upper end of a pistol grip or handle 86, the upper end of said handle also having a ratchet rod 88 mounted therein for movement longitudinally in said barrel. A disk 87 is secured upon the inner end of ratchet rod 88 and is adapted to engage a disk or diaphragm 89 mounted in the end of the grease cartridge remote from its outlet 82a. Operation of the spring-pressed dispenser trigger 90 will cause pawl 91 to advance ratchet rod 88 and to also advance cartridge diaphragm 89 within the cartridge, thereby expelling grease from the cartridge through outlet 82a, into fitting 50, through duct 49, through orifices 46, and into reservoir 45. Spring-pressed dog 92 serves to retain the successive steps or advancements of the ratchet rod 88 made by operation of trigger 90.

In the present embodiment of invention, four operations of the dispenser trigger 90 will fill reservoir 45 with grease to ninety percent of total capacity. This ninety percent as will be explained later, is the proper grease load, as ten percent must be air cushion. The dispenser is then removed from fitting 50, and the lubricator is ready for operation. A plurality of bearings can now be lubricated without further loading.

Prior to lubrication, the lubricator should be adjusted to fit the size or sizes of the bearings to be lubricated. To adjust the lubricator to process a plain-type bearing selected for lubrication the knob 79b is adjusted until space 70c is equal in width to the width of the outer member of the bearing selected that is, so that the dimension A is equal to dimension B (FIGURE 5). To adjust for anti-friction type bearings proceed as above, then increase the width of space 70c by one-half turn of knob 70b.

To lubricate a bearing, the bearing is placed between the injector head assembly 11 and the pressure head assembly 12 and the clamp assembly 10 is closed. During this clamp closing the following sequence of events takes place:

(A) As illustrated in FIGURE 3, the inner-bearing member 62 is contacted by the inner-sealing member or stepped cone 64 of the injector head assembly 11 and by the inner-bearing contact member or stepped cone 69 of the pressure head assembly 12. This two-point initial contact aligns the lubricator to the bearing and insures precision placement of the bearing in the lubricator.

(B) As illustrated in FIGURE 4, contact is next made on the outer-bearing portion 61 by the outer-contact member 68 of the pressure head assembly 12 and at the same time by the outer-sealing member or resilient ring 60 of the injector head assembly 11. The space or clearance 63 between the inner and outer bearing members 61 and 62 is thus sealed early in the clamping operation. The importance of this early sealing will be discussed later.

(C) Because outer contact member 68 is unyieldingly attached to the clamp jaw or arm 16, further closing of the clamp will force the clamped bearing 61, 62 towards the injector head assembly. This movement of the bearing will force spring-loaded piston 32 and spring-loaded piston 53 backwardly to decrease the volume of reservoir 45. Reservoir 45, as mentioned above, is loaded with a grease-air mixture. Backward travel of the two pistons 32, 53 will compress this grease-air mixture, and the pressure will be proportional to the backward travel of the pistons, which travel is controlled by operation of the clamp.

(D) Grease-air pressures thus generated in reservoir 45 will react in the following manner:

(1) Pressures will act on fixed grease surface 95 of grease bulkhead-piston 38 and will tend to force the latter member backwardly but the inturned flange 26b will prevent such backward movement (see FIGURE 2);

(2) Pressures will react on grease surfaces 96 of the inner-piston 53 and will tend to urge this piston forward with a thrust that is proportional to the pressures generated, and (3) Pressures will react on grease surface 97 of outer-piston 32 and will tend to urge this piston forwardly with a thrust that is proportional to the pressures generated.

Grease under pressure will be transmitted thereby through annular grease duct 32b between the inner and outer pistons 53 and 32 respectively, through valve 32a, 53a, to the annular channel 99 between the inner cone seal 64 and the outer ring seal 60 (FIGURE 5), and then to the annular space or clearance 63 between the inner and outer bearing components 62, 61. Normal clamping can generate pressures up to two and one-half times, the pressures found necessary to lubricate any plain bearing found to date.

Stated differently the present lubricator comprises an improved bearing sealing system that in operation makes contact on the ball and on the race of a bearing at pressures that are sensitive to, and vary with, the pressures of grease generated within the injector head during the lubrication of a given bearing. An increase of grease pressure during the lubrication of a bearing will cause a corresponding increase of pressure on the bearing surfaces by the inner and outer resilient sealing members of the injector head. This improved system will contain or seal off grease at a very high pressure. It also eliminates the possibility of bearing or bearing seal damage due to the employment of powerful springs to thrust the sealing contacts against the bearing surfaces.

To cover in more detail, the injector head assembly has an outer-piston 32 that is so constructed and its grease-contact surfaces so proportioned that the sealing-contact pressures transmitted to the outer resilient seal 60 are in direct proportion to the generated grease pressures within reservoir 45. Thus the resilient seal 60 of the injector head assembly 11 makes sealing-contact on the outer-bearing portion 61 of a bearing at contact pressures that increase or decrease directly in proportion to grease pressures generated within the injector head.

Likewise, the injector head assembly has an inner sealing assembly that is so constructed and its grease-contact surfaces so proportioned that, during a lubricating operation, grease pressures generated within the injector head assembly reservoir 45 are transmitted to the grease surfaces 96 of the inner piston 53 so that sealing-contact pressures of the attached inner resilient seal 64 are in direct proportion to the generated grease pressures.

As successive bearings are lubricated knob 70b is adjusted so that the distance between the injector head assembly 11 and the pressure head assembly 12 is decreased to compensate for a diminishing supply of grease in reservoir 45. It is evident that pistons 32 and 53 must retreat further into the injector head assembly at each operation in order to compress the grease-air mixture left in reservoir 45. Hence the volume of reservoir 45 must vary.

Reservoir 45 has a maximum volume when pistons 53 and 32 are fully extended to the right in FIGURE 2. The reservoir decreases in volume when pistons 53 and 32 are forced to retreat to the left from their fully extended position as described in paragraph "C" above.

During a lubricating operation, the inner piston 53 and the outer piston 32 are forced to retreat within the injector-head assembly 11 by action of contact 68. The retreat of these two pistons causes the internal dimensions of reservoir 45 to diminish while the grease-air mixture therein is compressed, thereby generating follow-up pressures within the injector-head.

The maximum pressure generated in reservoir 45 during any lubricating operation is the result of three factors, namely, (1) the maximum "retreat" position of pistons 53 and 32 when fully clamped, the latter position being adjustable by means of knob 70b, (2) the amount of grease contained within reservoir 45, and (3) the amount of air contained within the reservoir.

As stated above, the reservoir 45 contains 90% grease and 10% air when properly loaded. Due to the high compressibility of air, the relatively non-compressibility of grease, and to the high percentage of grease in the grease-air mixture of a fully loaded reservoir 45, the grease-air mixture in the fully loaded reservoir will compress more quickly than when the volume of the grease in the mixture is decreased; consequently, only a short backward travel of pistons 53 and 32 is required to generate the pressure necessary to lubricate the first bearing.

At the end of the first lubricating operation, the quantity of grease in reservoir 45 will have diminished by the amount of lubricant used on the first bearing; and the quantity of air in the reservoir will have been increased by the volume of lubricant expelled in lubricating the first bearing. The new mixture will therefore be more compressible than the initial mixture. By adjusting the knob 70b, the pistons 53 and 32 will be forced farther into the injector-head assembly so that pressures substantially equal to the initial pressures will be generated in subsequently lubricated bearings. This adjustment is continued after each successive bearing until the grease contained in reservoir 45 is exhausted.

FIGURES 3, 4, 5 and 6 illustrate progressively the relative positions of the parts of a plain-type bearing and of adjacent parts of the lubricator during a lubrication cycle. By their construction, plain-type bearings are the most difficult to lubricate because they comprise an inner bearing member, or ball, that has a spherical outer-radius mated with close tolerane to the inner spherical surface of the outer-bearing member, or outer race. Any pressure exerted on one side of the ball will force the ball against the mating surface of the outer race on the side opposite to the applied pressure. Such mating surfaces will normally institute a seal through which grease or air cannot be forced.

This lubricator successfully lubricates plain-type bearings because of two unique features:

(A) Controlled compression and expansion of the grease-air mixture contained in reservoir 45 of the injector head assembly.

(B) Controlled movement of the bearing ball within the bearing outer race while the space between the ball and the race is under grease pressure from the lubricator.

FIGURE 3 illustrates the initial double contact made by stepped cones 64 and 69 of the lubricator on the inner member 62 of a bearing as previously discussed. It is important to note that the bearing ball 62 is centered in the race 61.

FIGURE 4 illustrates conditions when contact member 68 and sealing member 60 first make contact. Note that the bearing ball 62 at this point of the closing cycle is forced against the bearing outer race 61 as at 61a by spring loaded stepped cone 69, the cone 69 being subjected to high pressure spring 77 and the cone 64 to a low pressure spring 55 (FIGURE 5). Also, note that grease-air pressure in reservoir 45 is zero when the parts are positioned as shown in FIGURE 4 in the clamping cycle, because the high pressure spring 77 has caused retraction of inner piston 53 and the opening of valve 32a, 53a immediately preceding the engagement of contact seal 60 with the proximate face of socket portion 61.

FIGURE 5 illustrates conditions later in the clamp-closing cycle. At the point illustrated (about 80 pounds per square inch) pressure of spring 55 plus grease-air pressure exerted on grease surfaces 96 of inner-piston 53 has equalized the thrust of cone 69 under the influence of spring 77. Note that the ball 62 is again centered in the outer race 61, and also that valve 32a, 53a is in opened position so that the annular clearance 63 between the bearing ball and outer race is now subjected to grease-air pressure from reservoir 45.

It is evident the valve 32a, 53a will be opened to admit lubricant into annular channel 99 and bearing clearance 63 when the total pressures urging piston 32 and its associated ring 60 toward pressure head 12 exceed the total pressures urging inner piston 53 and its associated cone 64 in the same direction. The converse is true when valve 33a, 53a is in closed position.

FIGURE 6 illustrates conditions when the bearing is fully clamped. Note that combined spring and grease-air pressures exerted on inner piston 53 has overpowered the spring thrust of cone-shaped member 69 and that the ball 62 is now mated against the outer race 61 as at 61b on the pressure head side of the lubricator.

Thus, during the closing cycle, the inner ball or bearing component 62 has been moved in the race 61 from center to the injector head side, back to center, and then to the pressure head side.

During an opening cycle the above-described sequence of ball movement is in reverse, that is, from the pressure head side to center, from the center to the injector head side, and then back to center.

During clamping operations, a pressurized column of grease is transmitted from reservoir 45, through duct 32b, into the annular channel 99 lying between sealing members 60 and 64, and then into the annular space 63 between the inner and outer bearing components. However, because this annular clearance 63 between the bearing components is closed as at 61b by mating of surfaces at the pressure head side (see FIGURE 6) and forms an air-tight valve, grease penetration between bearing members is limited by a volume of air compressed in this space. Greater grease pressures at this time will increase the area of penetration by decreasing, by compression, the volume of air; however, when grease pressures are reduced at the end of the lubricating operation, this volume of air will expand thereby expelling most of the grease that has been forced into the area.

To successfully lubricate a plain-type bearing at practical pressures, the mating surfaces at 61b of the bearing ball 62 and the bearing race 61 must be disengaged while the space between the bearing ball and race is still subject to grease pressure. This is accomplished in this device by the simple closing and partial opening of the clamp. In practice an operator closes and partially opens the clamp four times when lubricating a plain-type bearing, and by this movement, as explained above, the bearing ball 62 is oscillated within the bearing race 61 while the intervening space 63 is subject to grease pressure. This action vents the air trapped between the bearing ball and race and allows the grease to completely fill the void. To further aid satisfactory lubrication, the oscillations of the bearing ball within the bearing race has a pump-like action that aids in the distribution of grease forced by pressure into the bearing void. Bearings of the above plain-type are lubricated by this lubricator at pressures ranging between 100 and 180 p.s.i. The pressure range is due to individual bearing design, and difference in clearances between balls and races.

Thus the present device makes possible the lubrication of plain bearings by controlling during a lubricating operation the position of the bearing ball within the bearing race so that the ball oscillates within the race according to a fixed pattern in response to pulsating lubricant-air pressures, and at a point in the lubrication cycle during which the space between the bearing ball and bearing race is subject to grease pressure. The oscillation of the ball within the race breaks the valve-like sealing contact at 61b (FIGURE 6) which is established during a lubricating operation between the outer surface of the bearing ball and the inner surface of the bearing race. Such disengagement of these mated members vents the air normally trapped between these members, and grease under pressure enters the space 63 between said bearing members and is evenly distributed within the space by the pump-like oscillations of the bearing ball. Tests have established that plain-type ball bearings cannot be lubricated by a pressure system unless the above conditions are established during a lubricating operation.

Certain types of ball and roller-type bearings comprise inner and outer bearing members with rollers or balls mounted between the outer radius of the inner member and the inner radius of the outer member; the space for the containment of rollers, or balls, is protected at opposite faces of the bearing by a dirt seal, consisting usually of a metal insert with a backing of some semi-resilient material. Any substantial pressure exerted on one face of the inner bearing member will force this member to make contact with the semi-resilient backing of the dirt seal on the opposite face. To effectively relubricate a bearing of the above type, new grease must enter between the ball and dirt seal on one side and old or contaminated grease must be purged from between the bearing ball and dirt seal on the other side. Forceful union of the above bearing members—the ball and the dirt seal—will in effect close the grease channel between the ball and dirt seal. Such closing will greatly increase the pressure required to lubricate this type ball or roller bearing.

FIGURE 7 illustrated a ball-type rod end bearing clamped in the lubricator in the fully clamped position. Note that the bearing inner race 101 is centered in the bearing outer race 102 and the dirt seals 103 are not compressed on either side. This is a controlled condition, which control is a function of the lubricator. Under ideal conditions tests indicate that ball and roller-type bearings can be lubricated at approximately 80 p.s.i. This lubricator is designed so that at approximately 80 p.s.i. the thrust of member 69 due to spring pressure equals the thrust of member 64 due to the combined grease-air, and spring pressures. This equal pressure centers the bearing inner race in the bearing outer race; consequently the bearing-ball and the dirt seals are not forcibly united on either side, and a low resistance path for grease is thus established between the bearing inner race and dirt seal at the time that grease pressures most advantageous for effective lubrication are available. Tests have established that bearing dirt seals are not damaged if lubricating pressures are increased gradually, and if such pressures are limited to less than 100 p.s.i.

In the drawings and specification there has been set forth a preferred embodiment of the invention, and although specific terms have been employed they are used in a generic sense and not intended for the purpose of limitation, the scope of the invention being defined in the following claims:

1. In an apparatus for lubricating a bearing provided with substantially concentric outer and inner relatively rotatable bearing portions with an annular clearance between said portions, the combination of means for independently clamping said outer and inner bearing portions, means for delivering a lubricant under pressure into the clearance between said clamped portions, means for imparting relative reciprocatory movement to the respective clamping means and the bearing portions clamped thereby concurrently with the operation of said lubricant delivery means, and means operable concurrently with the delivery of said lubricant for maintaining at least one of the respective clamping means in position under pressures varying in proportion to the respective lubricant delivery pressures.

2. Apparatus for lubricating a bearing provided with substantially concentric inner and outer relatively rotatable bearing portions with an annular clearance between said portions, said inner portion having a bore therethrough concentric with the axis of rotation of the bearing, comprising means for clamping said outer bearing portion, said means forming a chamber surrounding one end of and communicating with said clearance, a second means engageable with opposite ends of said bore for clamping said inner bearing portion, a source of lubricant under pressure, means responsive to the clamping pressures of said first and second means for concurrently maintaining said inner bearing portion in a substantially mean central position within said clearance and for admitting a column of pressurized lubricant from said source through said chamber and into said clearance.

3. In an apparatus for lubricating a bearing provided with substantially concentric outer and inner bearing portions having an annular clearance therebetween, said inner bearing portion having a bore therethrough concentric with the axis of rotation of said bearing, the combination of means for independently clamping said bearing portions, means for supplying lubricant under pressure into one end of said clearance between the clamped bearing portions, one of said clamping means including means for forming a separable sealed contact between said admitting means and one face of said outer bearing portion, said contact surrounding the outer perimeter of said clearance end, the other of said clamping means including means for forming a second separable sealed contact between said admitting means and one face of said inner bearing portion, said second contact being surrounded by the inner perimeter of said clearance end, and means operable during the supply of said lubricant for maintaining said sealed contacts in position under pressures proportional to the respective lubricant pressures in said supplying means.

4. That method of lubricating a bearing provided with substantially concentric inner and outer relatively rotatable bearing components with an annular clearance between said components, comprising the step of establishing a disconnectable pressure-sealed connection between one end of said clearance and a source of mixed lubricant and air, and the concurrent steps of introducing said mixture under continuous pressure from said source into said end of said clearance, alternately opening and closing the other end of the clearance to intermittently release and confine the lubricant pressures in the clearance, and maintaining a sealing at said pressure-sealed connection in direct proportion to said mixture pressure.

5. That method of lubricating a bearing provided with substantially concentric inner and outer relatively rotatable bearing components with an annular clearance between said components, comprising the concurrent steps of introducing a mixture of lubricant and air under continuous pressure into one end of said annular clearance and alternately opening and closing the other end of the clearance to produce pulsating mixture pressures within the clearance.

6. In an apparatus for lubricating a ball-and-socket type bearing having a spherically shaped clearance between the inner opposed bearing surfaces of and substantially concentric with the axis of rotation of the bearing, the ends of said clearance being restricted and extending to the opposite exterior faces of the bearing, and a resilient annular shield at each end of said clearance for preventing entry of dirt and the like, the outer perimeter of said annular member being secured to said socket and the inner perimeter wipingly contacting said ball, the combination of means for directing a mixture of lubricant and air under pressure against the outer faces of one of said shields and the adjacent end of said ball to thereby force the mixture between the two last-named members and into said clearance, and means for simultaneously exerting an opposing pressure substantially equal to said mixture pressure upon the opposite end of said ball, whereby the ball is maintained substantially in its mean central position to permit said mixture to flow at relatively low pressures between said ball and shield at one end of the clearance, into said clearance, and then between said ball and shield at the opposite end of the clearance.

7. In an apparatus for lubricating a bearing provided with inner and outer relatively rotatable bearing portions, said portions having a clearance therebetween extending through said bearing, means for clamping the rotational axes of the respective inner and outer bearing portions at right angles to a common plane comprising the combination of a pair of spaced relatively movable members for clamping said outer bearing portion along its rotational axis, and a second pair of spaced clamping members respectively mounted for movement upon said first clamping members for clamping said inner bearing portion along its rotational axis.

8. Lubrication apparatus as defined in claim 7 and further comprising spring means engageable with each of said second pair of clamping members for yieldingly opposing movement by said clamped inner bearing portion in either direction along the rotational axis of the latter.

9. In an apparatus for lubricating a bearing provided with inner and outer relatively rotatable bearing portions, said portions having an annular clearance therebetween extending substantially coaxially through said bearing, the combination of means for clamping said inner bearing portion in alignment with its rotational axis, means for clamping said outer bearing portion in alignment with its rotational axis, the respective rotational axes of said clamped bearing portions being disposed normal to a common plane, and the respective clamping means being axially movable relative to one another, a source of mixed lubricant and air, means including a valve for connecting said source with one end of said clearance, means responsive to progressively increasing pressures of said first and second clamping means upon said portions for compressing said lubricant-air mixture, and means responsive to said compressed mixture for actuating said valve means.

10. In an apparatus for lubricating a bearing provided with inner and outer relatively rotatable bearing portions, said portions having an annular clearance therebetween extending substantially coaxially through said bearing, the combination of clamping means individual to each of said bearing portions, a source of mixed lubricant and air connectable with one end of said clearance, valve means in said connection, means responsive to the pressures of said clamping means upon said portions for compressing the mixture in said source, and means operable by said compressed mixture for actuating said valve means.

11. In an apparatus for lubricating a bearing provided with inner and outer relatively rotatable bearing portions, said portions having an annular clearance therebetween extending substantially coaxially through said bearing, the combination of clamping means individual to each of said bearing portions, the respective clamping means being axially movable relative to one another, a source of mixed lubricant and air connectable with one end of said clearance, means responsive to the pressures of said clamping means upon said portions for compressing the mixture within said source, means operable by said compressed mixture for effecting relative axial movement between the respective clamping means, and valve means operable by said relative axial clamp movement for controlling the flow of the compressed mixture from the source into said clearance of a connected bearing.

12. In an apparatus for lubricating a bearing provided with relatively rotatable ball-and-socket bearing portions having a substantially spherically shaped clearance therebetween extending through the bearing, said ball portion having a bore extending along its rotational axis, the combination of a pair of relatively movable members engageable respectively at the opposite ends of said bore for clamping said ball portion along said axis, one of said members including a resilient member sealing said bore, a second pair of relatively movable members engageable respectively with opposite faces of said socket portion to clamp the latter along its rotational axis, the respective rotational axes of said clamped bearing portions being disposed normal to a common plane, one of the members of said second pair cooperating with said resilient sealing member to form a sealed chamber communicating with the adjacent end of said clearance, and means responsive to clamping pressures on said bearing portions for supplying lubricant under pressure to said chamber.

13. In an apparatus for lubricating a bearing provided with relatively rotatable ball-and-socket portions, said portions having a substantially spherically shaped clearance therebetween extending coaxially through the bearing, the combination of a pair of relatively movable jaws, means carried by said jaws for clamping said socket portion in alignment with the axis of rotation of the bearing, means movably mounted upon said first clamping means for clamping said ball portion coaxially with said socket portion, a source of lubricant under pressure, means responsive to said first and second clamping means for admitting lubricant from said source into one end of said clearance, and means operable concurrently with said lubricant admitting means and alternately responsive to said lubricant and clamp pressures for oscillating said ball within said clearance.

14. A portable self-contained apparatus for lubricating a bearing provided with relatively rotatable ball-and-socket bearing portions having a clearance therebetween extending substantially coaxially through the bearing, said ball portion having a bore therethrough coaxial with its axis of rotation, comprising a pair of relatively movable handles adapted to be gripped by the hand of an operator, a pair of relatively movable jaws for receiving said bearing therebetween, joint mechanism interconnecting said jaws and handles whereby the gripping of the latter will actuate the jaws, means mounted on said jaws for clamping said socket bearing portion along its rotational axis, means movably mounted upon said first clamping means for clamping said ball portion along its rotational axis, the respective rotational axes of said ball and socket portions being disposed normal to a common plane, means carried jointly by said first and second clamping means for forming a sealed chamber communicating with one end of said clearance, a source of lubricant under pressure mounted on one of said jaws, means responsive to said gripping pressure for admitting lubricant from said source into said chamber, and means operable concurrently with said admitting means and responsive to alternately increasing and decreasing gripping pressures upon said handles for imparting relative axial movement alternately in opposite directions to the respective clamping means and the bearing portions clamped thereby.

15. That method of lubricating a bearing provided with relatively rotatable ball-and-socket portions, said portions having a substantially spherically shaped clearance therebetween extending through the bearing, comprising the concurrent steps of: independently clamping the socket portion along its axis of rotation, introducing a mixture of lubricant and air under pressure against said ball portion and into the adjacent end of said clearance, and exerting a substantially equal oppositely acting pressure upon the ball portion to thereby maintain the latter in substantially mean central position within said socket portion and intervening clearance.

References Cited by the Examiner
UNITED STATES PATENTS
2,396,124  3/46  Pitisci _____ 184—1

LAVERNE D. GEIGER, *Primary Examiner.*
M. KAUFMAN, *Examiner.*